US009285063B2

(12) United States Patent
Jones

(10) Patent No.: US 9,285,063 B2
(45) Date of Patent: Mar. 15, 2016

(54) CONNECTION FITTING FOR CONNECTING THERMOPLASTIC PIPES

(71) Applicant: Mark L. Jones, Jacksonville, FL (US)

(72) Inventor: Mark L. Jones, Jacksonville, FL (US)

( * ) Notice: Subject to any disclaimer, the term of this patent is extended or adjusted under 35 U.S.C. 154(b) by 0 days.

(21) Appl. No.: 14/312,601

(22) Filed: Jun. 23, 2014

(65) Prior Publication Data
US 2014/0375047 A1 Dec. 25, 2014

Related U.S. Application Data

(60) Provisional application No. 61/838,272, filed on Jun. 22, 2013.

(51) Int. Cl.
*F16L 47/02* (2006.01)
*F16L 47/03* (2006.01)

(52) U.S. Cl.
CPC *F16L 47/02* (2013.01); *F16L 47/03* (2013.01)

(58) Field of Classification Search
USPC .......... 285/222.1–222.5, 285.1, 288.1, 290.3, 285/293.1, 331, 924, 289.1, 915
See application file for complete search history.

(56) References Cited

U.S. PATENT DOCUMENTS

| 213,577 | A | * | 3/1879 | Kennedy | 285/257 |
|---|---|---|---|---|---|
| 1,440,508 | A | * | 1/1923 | Todd | 285/222.2 |
| 3,208,255 | A | * | 9/1965 | Burk | 72/57 |
| 3,794,359 | A | * | 2/1974 | Fisher | 285/55 |
| 4,043,857 | A | | 8/1977 | Byrne et al. | |
| 4,400,019 | A | * | 8/1983 | Fruck | 285/55 |
| 4,875,710 | A | | 10/1989 | Mercado | |
| 5,282,652 | A | * | 2/1994 | Werner | 285/55 |
| 5,824,179 | A | | 10/1998 | Greig | |
| 6,164,702 | A | | 12/2000 | Hauber et al. | |
| 6,198,081 | B1 | | 3/2001 | Steinmetz et al. | |
| 6,293,311 | B1 | | 9/2001 | Bushi et al. | |
| 6,375,226 | B1 | | 4/2002 | Dickinson et al. | |
| 7,469,935 | B2 | | 12/2008 | Smahl | |
| 7,510,623 | B2 | | 3/2009 | Lutz et al. | |
| 8,034,211 | B2 | | 10/2011 | Andersen | |
| 8,424,924 | B2 | | 4/2013 | LaMarca et al. | |
| 2005/0121913 | A1 | * | 6/2005 | Smahl | 285/423 |
| 2007/0200342 | A1 | * | 8/2007 | Roberts-Moore et al. | 285/288.1 |

(Continued)

FOREIGN PATENT DOCUMENTS

CN 102588684 A 7/2012
DE 10 2010 029 715 A1 12/2011

(Continued)

*Primary Examiner* — Aaron Dunwoody
*Assistant Examiner* — Fannie Kee
(74) *Attorney, Agent, or Firm* — Stephen E. Kelly; Rogers Towers, P.A.

(57) ABSTRACT

A joint fitting for thermoplastic pipes. The fitting member has a receptor and an insert. The receptor fits snugly over the thermoplastic pipe, and the end of the pipe abuts against the fitting member. These respective contact surfaces are fused together by thermal welding, thus forming a socket seal and an abutting seal to strengthen the joint and to protect any glass fiber reinforcing layer of the pipe. One embodiment of the fitting also comprises a glass fiber reinforcing member that provides structural strength to the fitting member. In another embodiment, the fitting comprises an inner rim that fits inside the end of the thermoplastic pipe, thereby forming a double socket, abutted seal between the fitting and the pipe. Other embodiments comprise a valve for releasing gas and molten thermoplastic material during the thermal welding process.

4 Claims, 10 Drawing Sheets

(56) References Cited

U.S. PATENT DOCUMENTS

| | | |
|---|---|---|
| 2009/0091128 A1* | 4/2009 | Cloos et al. ............... 285/222.4 |
| 2009/0173441 A1 | 7/2009 | Lutz et al. |
| 2010/0295299 A1 | 11/2010 | Ziu |
| 2011/0248495 A1* | 10/2011 | LaPlante et al. ............ 285/331 |
| 2012/0175006 A1 | 7/2012 | Frimel et al. |
| 2012/0217738 A1 | 8/2012 | King et al. |
| 2013/0140811 A1 | 6/2013 | Fahrer et al. |

FOREIGN PATENT DOCUMENTS

| | | |
|---|---|---|
| JP | 10-30781 | 2/1998 |
| WO | WO 95/03162 | 2/1995 |

* cited by examiner

CONNECTION FITTING FOR CONNECTING THERMOPLASTIC PIPES

CROSS-REFERENCE TO RELATED APPLICATION

Pursuant to 35 U.S.C. §119(e), this application claims the benefit of U.S. Provisional Patent Application Ser. No. 61/838,272, filed on Jun. 22, 2013, the entire contents of which is incorporated herein by this reference.

BACKGROUND (a) Field of Endeavour

The device described herein relates generally to the field of fittings, couplings, and joints for thermoplastic pipes, and especially to prefabricated pipe fittings for field installation on such pipes.

(b) Description of Related Art

In industrial, commercial and residential settings, hard mechanical piping systems are used to transport liquids or gasses throughout the structure and surrounding grounds. These hard piping systems come in four basic types, depending on their respective materials: (i) metal, (ii) thermoset, such as fiberglass reinforced plastic ("FRP"), (iii) thermoplastic, and (iv) composites of these three materials. Composites further consist of thermoplastic liners reinforced with either metal or FRP structures. A new tri-layered composite piping system has been developed in recent years. This pipe consists of two thermoplastic pipes with a FRP reinforcement layer sandwiched between them.

The weakest part of any mechanical piping system is the fitting joint, which is almost always weaker than the pipe itself. These weaknesses are inherent in the various types of joining methods used. All the various piping systems are joined mechanically by flanging and/or threading. Metal pipes and fittings are also welded. FRP pipes and fittings use adhesives. Thermoplastic pipes and fittings use either thermal heat welding or solvent cementing.

The thermoplastic pipe industry has used thermal heat welding, also called thermal fusion, and solvent cementing as the two primary joining methods. Between thermal heat welding and solvent cementing, thermal heat welding is the most integrated joining method. Solvent cementing is still used extensively for polyvinylchloride ("PVC") and chlorinated polyvinylchloride ("CPVC") material pipe systems because a reliable thermal heat welded joining system has not been completely developed by the industry for these systems. The list of thermoplastic materials that can be and are joined by thermal heat welding, includes, without limitation: PVC, CPVC, polyethylene ("PE"), polypropylene ("PP"), polyvinylidene fluoride ("PVDF"), ethylene chloro tri fluoro ethylene ("E-CTFE"), perfluoroalkoxy alkane ("PFA"), and others.

In thermal heat welding, two thermoplastic surfaces are heated to a molten state and fused together under pressure. This process results in a homogeneous bond between the two surfaces. The three main joining methods for thermal heat welding are "butt" fusion, "socket" fusion and "electro" fusion. The end result of these three methods is a fusion weld on only one surface of the pipe.

Butt fusion welding heats the end of the pipes and fittings and brings them together in a melt state, or molten state, under pressure. In butt fusion welding, the ends of the pipes and fittings are the same dimensions. Butt fusion welding is widely accepted in the industry as the most integrated joining method, with the main drawback being head loss caused by the internal bead of thermoplastic material formed at the joint seam. Socket fusion welding heats the inside of the socket of the fitting and the outside of the pipe and inserts them into each other in a melt state under pressure. Socket fusion welding pushes the two melted surfaces together thus introducing stress at the joint area. It also has a crevice area where the interface between the pipe and the fitting is a sharp 90° angle. This 90° angle is shown in prior art references such as FIGS. 3A, 3C, and 4 of U.S. Pat. No. 6,293,311. This sharp 90° interface causes high stress under large bending moment forces, and this area is highly susceptible to crack initiation and propagation. Once a stress crack is started, the distance for the crack to propagate outside the fitting is minimal, and the joint will fail.

Solvent cementing of PVC and CPVC pipe employs a socket fitting like a socket fusion weld but with a taper in the fitting, which taper acts as a mechanical lock between the pipe and the fitting surfaces. The main weakness of solvent cementing is that the joint itself is mechanical because the two joining surfaces never do fuse together and thus may be separated with the application of a force. The corrosive nature of the media carried by the pipe may also chemically break down the cement, thereby weakening or breaking the joint.

Dual laminate pipe comprises a thermoplastic liner pipe that is reinforced with FRP on the outside for structural strength, thus yielding a two layered pipe. The thermoplastic liner is referred to as the corrosion barrier. Dual laminate piping is used where a corrosive atmosphere would prohibit the use of other pipes made of metal. Dual laminate pipes are among the most expensive piping systems that are used in industry. There are several methods for manufacturing and joining dual laminate pipes. Pipes and fittings are typically fabricated first, and then the outer FRP layer is removed around the joint area (typically by grinding it away) so that the thermoplastic liner pipe can be either thermally fused or solvent cemented to a fitting. Once the thermoplastic liner pipe has been joined to a fitting, FRP is then re-applied around the joint area for complete reinforcement.

In industrial settings, there is a common need to transport liquid media over long distances or across an industrial environment. Various pipes are used to meet these needs. For example, in the chemical processing industry, it is common to use steel pipe with corrosion barriers, or glass fiber reinforced pipe, or other types of dual laminate pipes. Similarly, it is common in the petroleum industry to use steel pipes in and around drilling equipment, transport and processing equipment, and in industrial distribution facilities. These types of pipe are used for their structural strength, their hoop strength that promotes the capacity to carry high-pressure media, and their resistance to the forces and stresses developed in the pipe when carrying high temperature and pressure media.

These conventional piping systems are expensive, labor intensive to build and maintain, and they have a relatively short lifecycle, sometimes lasting only five to ten years depending on the environment and the corrosiveness of the media. In many instances, these systems also require construction with heavy and expensive steel casings, components, and connection members. Saving weight with dual laminate pipe leads to a labor intensive and time consuming operation. Thermoset material is more expensive than thermoplastic, which greatly increases the cost of dual laminate piping systems compared to thermoplastic piping systems.

Consequently, it is advantageous to use thermoplastic pipes for their ease of use and for the cost effectiveness of designing, building, and maintaining thermoplastic piping systems. Thermoplastic piping systems are relatively easy to install. Equipment and methods for socket and butt thermal fusion have become standardized. However, past thermoplastic piping systems lack the structural strength to carry heavy media over long distances, and they perform poorly under high temperatures and pressures.

The tri-layered pipe described above has been recently used to address these problems. The main problem with these tri-layered thermoplastic pipes is that they are difficult to connect, and conventional thermoplastic pipe fittings do not adequately protect or seal with the unique tri-layered structure of these thermoplastic pipes. Likewise, conventional socket and butt thermal fusion connection methods are inadequate because they do not provide a seal that reliably protects the glass fiber reinforcing layer of the tri-layered, glass fiber reinforced, thermoplastic pipes ("TTP pipe") pipe from the corrosive media often transported in industrial piping systems. Conventional thermal welds are also conducive to cracks propagating from 90° angles between the socket surface and the abutment surface of the fitting members.

Therefore, what is needed is an improved, prefabricated thermoplastic fitting configured to accommodate the unique structural features of a tri-layered thermoplastic pipe, and a method for using the same.

SUMMARY OF THE INVENTION

The fitting is a combination single socket/butt thermally fused fitting having a first insert, a second insert, and an annular flange. The first insert is snugly inserted into the TTP pipe to the extent that the end of the TTP pipe abuts the flange, thereby forming a single socket interface between the TTP pipe and the first insert, and an abutted interface between the end of the TTP pipe and the flange. These single socket and abutted contacts are thermal welded along their respective interfaces to form a sealed connection along both the interfaces. The glass fiber reinforcing in the TTP pipe is therefore sealed from contact with the media carried by the TTP pipe, thereby protecting the glass fiber reinforcing from any corrosive or harmful effects caused by such media.

The second insert forms a similar sealed joint with standard fitting member. The second insert fits snugly inside the fitting member to the extent that the end of the fitting member abuts the flange. The single socket and abutting contacts are thermal welded along their respective interfaces to form a sealed connection along both the interfaces.

In another embodiment, the fitting is a double socket/butt fitting comprising a base member, and one or more coupling sections having an outer rim and an inner rim. The coupling section forms an annular channel having a U-shaped cross section for receiving and mating with the end of the TTP pipe. The U-shaped channel is sized to snugly receive the TTP pipe, thus forming sufficiently snug contact between the joining members. Once the end is mated with the U-shaped channel, the base member is fused to the TTP pipe, forming a U-shaped thermal weld that seals and protects the glass fiber reinforcing from corrosive media that may be transported through the TTP pipe.

In another embodiment, the coupling sections further comprise a valve for releasing gas during the thermal welding process. The valve can also be configured to release molten thermoplastic material, thereby providing a visual indication that the joint has been properly fused by thermal welding.

DETAILED DESCRIPTION

With reference to the drawings, the invention will now be described with regard to the best mode and the preferred embodiment. In general, the device is a connection fitting for joining pipes having thermoplastic surfaces connected by thermal fusion. The most advantageous features of the present connection fitting are best demonstrated in the context of tri-layered, glass fiber reinforced, thermoplastic pipes, and the embodiments discussed herein are set forth in that context. However, the embodiments disclosed herein are meant for illustration and not limitation of the invention. An ordinary practitioner will appreciate that without undue experimentation, the principles of the connection fittings taught herein can be employed with a variety of thermoplastic pipes, including, without limitation, TTP pipe, dual laminate pipe, single walled or single laminate pipe, fiber reinforced polymer pipes, super laminates, and the like.

Thermoplastic pipes, such as polyethylene and polyvinylchloride pipes, are common in the construction industry, chemical processing industry, and many other industries. These piping systems have become standardized, with a variety of standard connections and fitting members available. A common connection method for connecting thermoplastic pipe sections is by thermally fusing the pipe sections to standard fittings. Ordinary practitioners appreciate that there are a wide variety of standard fittings used in these processes, and there are a wide variety of methods of thermal fusion and plastic welding employed in the art. These thermal fusion and plastic welding methods include, without limitation, hot gas welding, heat sealing, speed tip welding, extrusion welding, contact welding, hot plate welding, injection welding, ultrasonic welding, and many others. For the purposes of the following discussion, these methods of thermal fusion and plastic welding will be collectively referred to herein as "thermal welding," "thermal welds," "welds," and like terms as indicated by the context.

Figure 1:
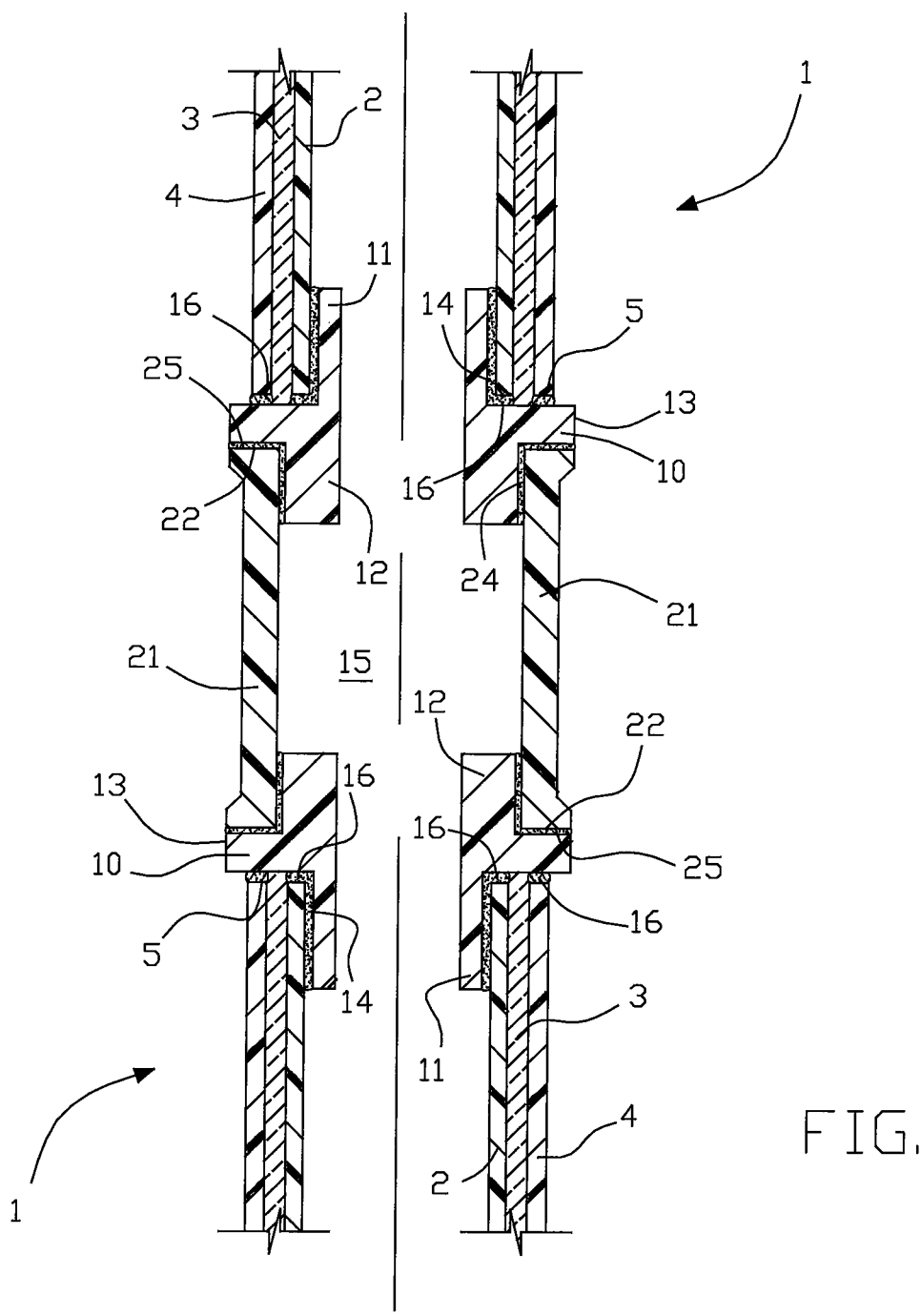
FIG. 1 is a cross section of one example embodiment of a fitting for tri-layered thermoplastic pipes according to the principles of the invention.
Figure 2:
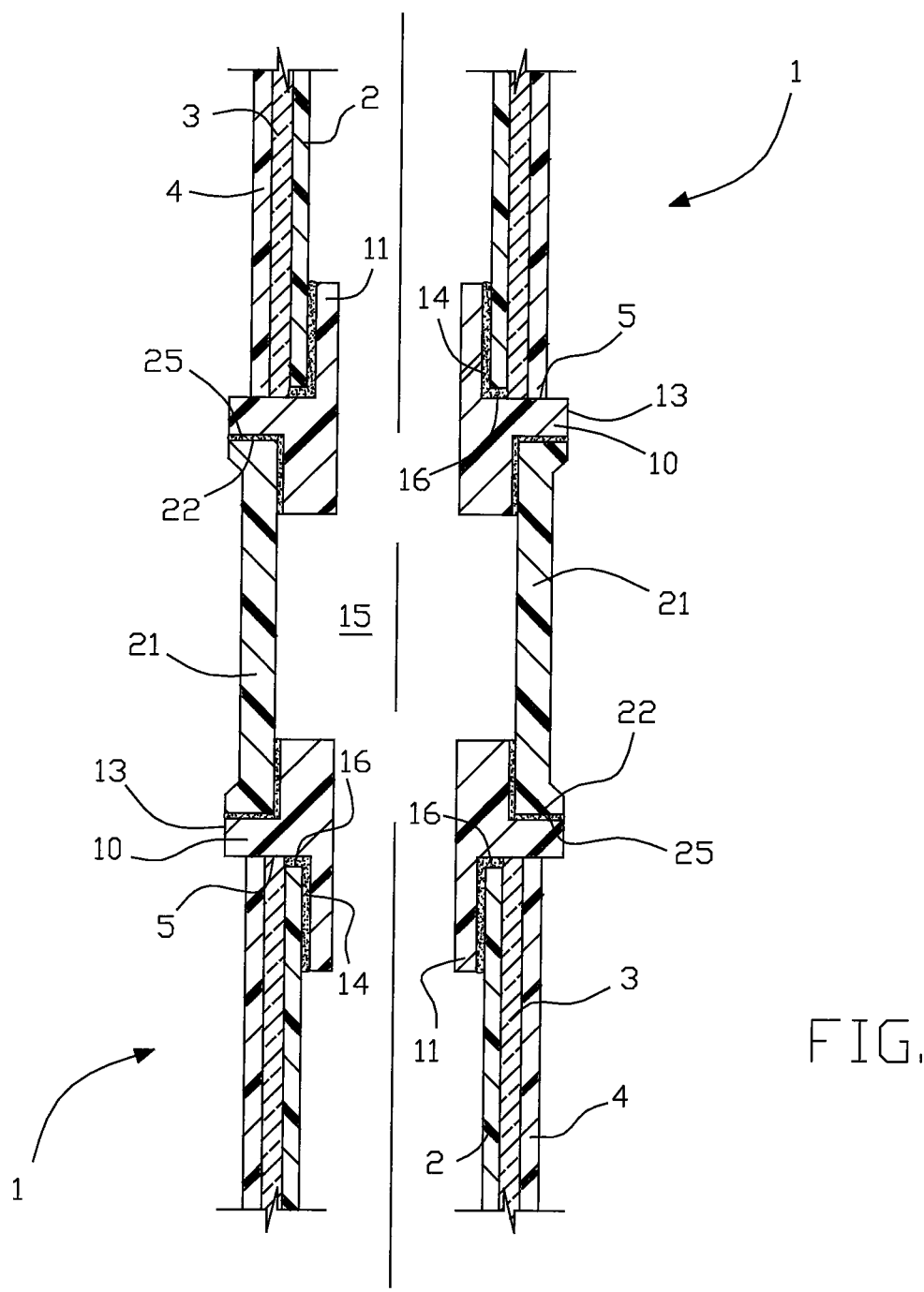
FIG. 2 is a cross section of another example embodiment of a fitting for tri-layered thermoplastic pipes, wherein the process pipe and the casing pipe comprise different thermoplastics.
Figure 3:
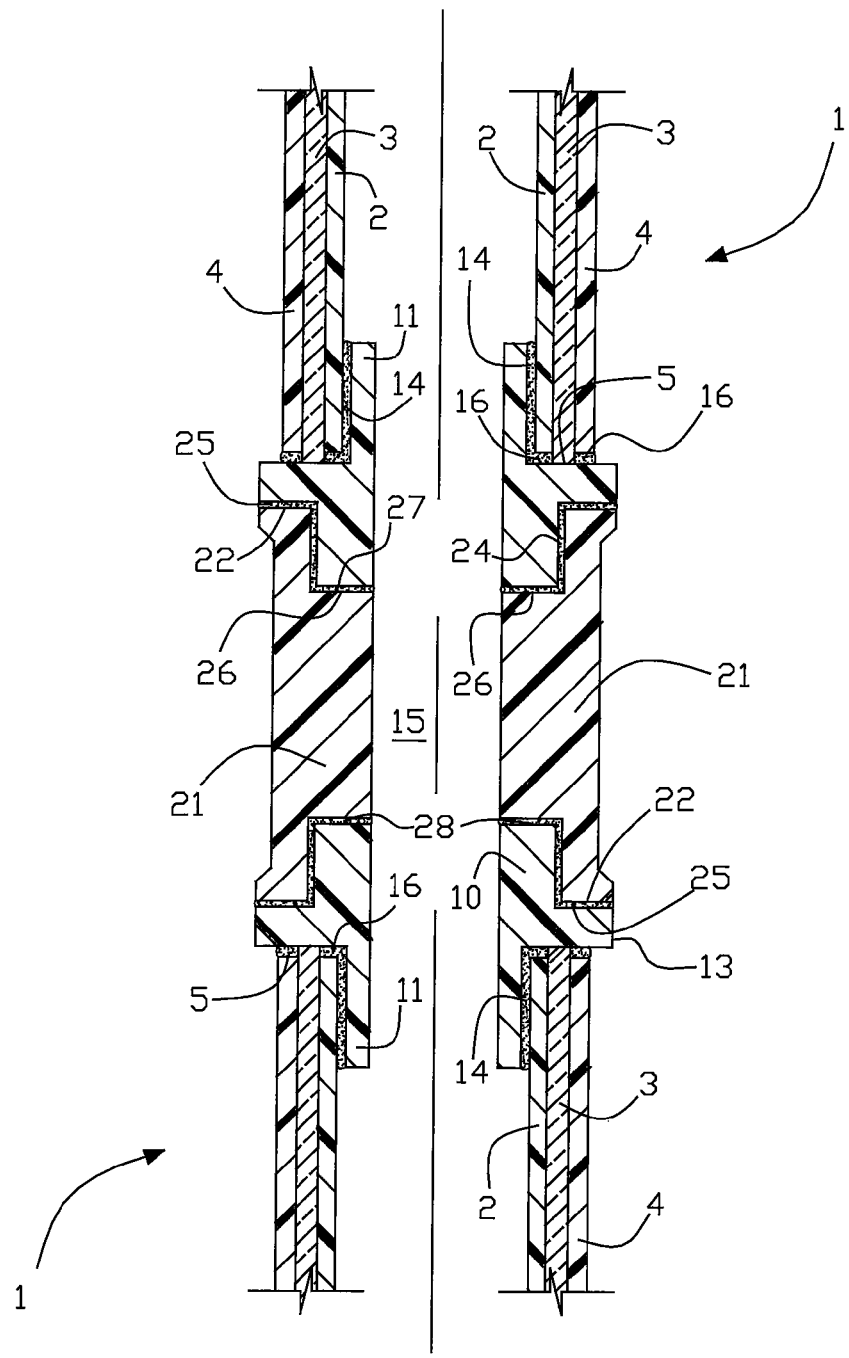
FIG. 3 is a cross section of another example embodiment of a fitting for tri-layered thermoplastic pipes.
Figure 4:
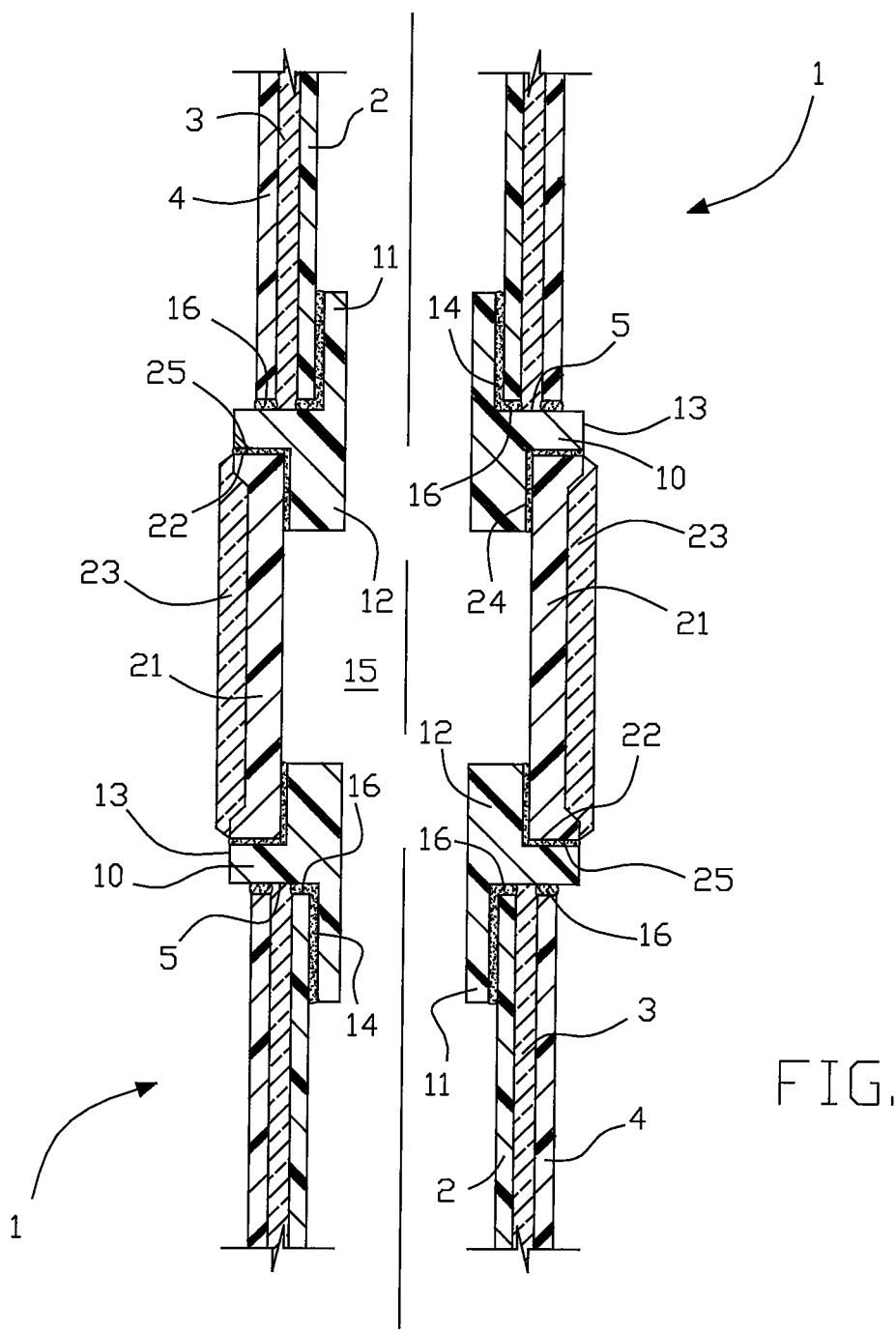
FIG. 4 is a cross section of another example embodiment of a fitting for tri-layered thermoplastic pipes, wherein the fitting member further comprises a reinforcing member.

In general, the connection fitting 10 connects a thermoplastic pipe 1, such as a TTP pipe 1, to a connection member 21. The connection member 21 is a joint fitting standard in the industry, such as the fitting member 21 shown in FIG. 1, or another thermoplastic pipe 1. Referring to FIGS. 1-3, a common formation of TTP pipe 1 comprises a thermoplastic process pipe 2 supported by a glass fiber reinforcing 3 matrix that forms a structural reinforcing layer to the TTP pipe 1, and a casing pipe 4 forming an outer layer. The process pipe 2 is the main, media carrying thermoplastic pipe member, and it can be any type of thermoplastic pipe or be comprised of any thermoplastic materials. The glass fiber reinforcing 3 provides structural strength to the process pipe 2, namely, bending strength and hoop strength. The casing pipe 4 is a protective layer that preserves the integrity of the glass fiber reinforcing 3. The casing pipe 4 is typically a thermoplastic pipe, but it could comprise other materials as well.

Joint connections are needed for these TTP pipes 1, and the joint connections vary by application. Depending on the circumstances, the joint connection may need to be an elbow, a straight connection, a T-connection, a Y-connection, or the like. Standard connections and fittings are available in the industry, and customized connections are manufactured as required. The present invention provides connectors for these types of standard fittings, connections, and joints as described below.

In one embodiment, shown in FIGS. 1-5, the TTP fitting 10 is a single socket/abutted fitting having a first insert 11, a second insert 12, and an annular flange 13. This TTP fitting 10 is used to connect a TTP pipe 1 to a fitting member 21. In most embodiments, the TTP fitting 10 is configured to accommodate connection of a TTP pipe 1 to a fitting member 21 that is a standard fitting in the industry. That is, the TTP fitting 10 functions as an adapter that allows connection of the specialized TTP pipe 1 to standard fittings and connectors, especially standard thermoplastic fittings and connectors. This saves the cost of designing and manufacturing customized fitting members 21, and it minimizes the specialized training needed for installation personnel to learn new installation methods for customized fitting members 21. In other embodiments, customized fitting members 21 confer an advantage, depending on the circumstances of the piping systems in which they are used. Customized fitting members 21 are discussed in greater detail below.

Generally, the first insert 11 has an outer diameter that is slightly larger than the inner diameter of the first TTP pipe 1, such that the first insert 11 cannot be dry fitted into the first TTP pipe 1. During the thermal welding process, the first insert 11 is heated and then inserted into the TTP pipe 1 to the extent that the end 5 of the TTP pipe 1 abuts the flange 13. This arrangement forms a single socket interface between the TTP pipe 1 and the first insert 11, and an abutted interface between the end 5 of the TTP pipe 1 and the flange 13. These single socket and abutted contacts are thermally welded along their respective interfaces to form a sealed connection along both the interfaces. More specifically, the first insert 11 is thermally welded to the process pipe 2 by a first socket weld 14, and the end 5 is thermally welded to the flange 13 by a first butt weld 16. The glass fiber reinforcing 3 in the TTP pipe 1 is therefore sealed from contact by the media 15 carried by the TTP pipe 1, thereby protecting the glass fiber reinforcing 3 from any corrosive or harmful effects caused by such media 15. Due to the socket weld 14 and butt weld 16 being oriented at about a 90° angle, the corner of the fitting 10 is structurally reinforced, thereby reducing stress and virtually eliminating the possibility of cracks propagating from the corner of the fitting 10.

In some embodiments of the TTP pipe 1, the process pipe 2 and the casing pipe 4 are made of the same thermoplastic material. In these embodiments, the first butt weld 16 fuses both of the process pipe 2 and the casing pipe 4 to the flange 13, as shown in FIG. 1. However, in other embodiments of the TTP pipe 1, the process pipe 2 could comprise a specialized thermoplastic pipe, such as fluoropolymer material or other specialized thermoplastic, which tends to be expensive. In these embodiments, to save cost the casing pipe 4 typically comprises a less expensive thermoplastic, meaning that the process pipe 2 and the casing pipe 4 comprise different thermoplastics. Consequently, in these instances the first butt weld 16 fuses only the process pipe 2 to the flange 13, as shown in FIG. 2. The casing pipe 4 is not fused to the flange 13 in these embodiments.

The second insert 12 forms a similar sealed joint with the fitting member 21. The second insert 12 has an outer diameter that is slightly larger than the inner diameter of the fitting member 21 such that the second insert 12 cannot be dry fitted into the fitting member 21. During the thermal welding process, the second insert 12 is heated and inserted into the fitting member 21 to the extent that the end 22 of the fitting member 21 abuts the flange 13. This arrangement forms a single socket interface between the fitting member 21 and the second insert 12, and an abutted interface between the end 22 of the fitting member 21 and the flange 13. The single socket and abutting contacts are thermal welded along their respective interfaces to form a sealed connection along both of these interfaces. More specifically, the second insert 12 is fused to the fitting member 21 by a second socket weld 24, and the end 22 is thermal welded to the flange 13 by a second butt weld 25.

In another example embodiment, shown in FIG. 3, the fitting member 21 further comprises a shoulder 26 configured to abut the distal end 27 of the second insert 12. The shoulder 26 is thermal welded to the distal end 27 in the manner and by the means described above, thereby forming a third butt weld 28. This third butt weld 28 adds connectivity strength to the joint, as well as further sealing protection from any leakage in the joint connection.

In any of the foregoing embodiments, the fitting member 21 can further comprise a glass fiber reinforcing member 23, which provides additional bending strength and hoop strength to the TTP fitting 10. (See FIG. 4). This additional bending strength enables the TTP fitting 10 to transfer bending moment forces across the joint area from one TTP pipe 1 to the connecting TTP pipe 1. The reinforcing member 23 is a glass fiber matrix that is applied to and bonded to the fitting member 21 by any conventional means, which will be appreciated by an ordinary practitioner. Such bonding means could be by an epoxy, a resin, a thermoset bond, or the like. The second butt weld 25 provides an additional protective seal in these embodiments, ensuring that the glass fiber reinforcing member 23 in the fitting member 21 is better sealed from contact with the media 15 carried through the TTP pipe 1, thereby protecting the glass fiber reinforcing member 23 from any corrosive or harmful effects caused by such media 15.

The foregoing embodiments contemplate a fitting member 21 that is standard in the art. However, in an example embodiment, shown in FIG. 5, the fitting member 21 is a custom member that is integral with the TTP fitting 10, thereby eliminating the need for the second socket weld 24, the second butt weld 25, and the third butt weld 28. Eliminating these welds is important for several reasons. First, the thermoplastic welds are typically completed in the field under varying conditions, sometimes in areas difficult to access. These challenges and uncertainties make quality control difficult, if not impossible. Second, minimizing the number of welds on the connection minimizes the amount of manual labor needed to build the piping system. Finally, joint failure most commonly occurs due to flaws in the welds, and minimizing the number of welds also minimizes the probability of joint failure due to weld flaws.

Figure 5:
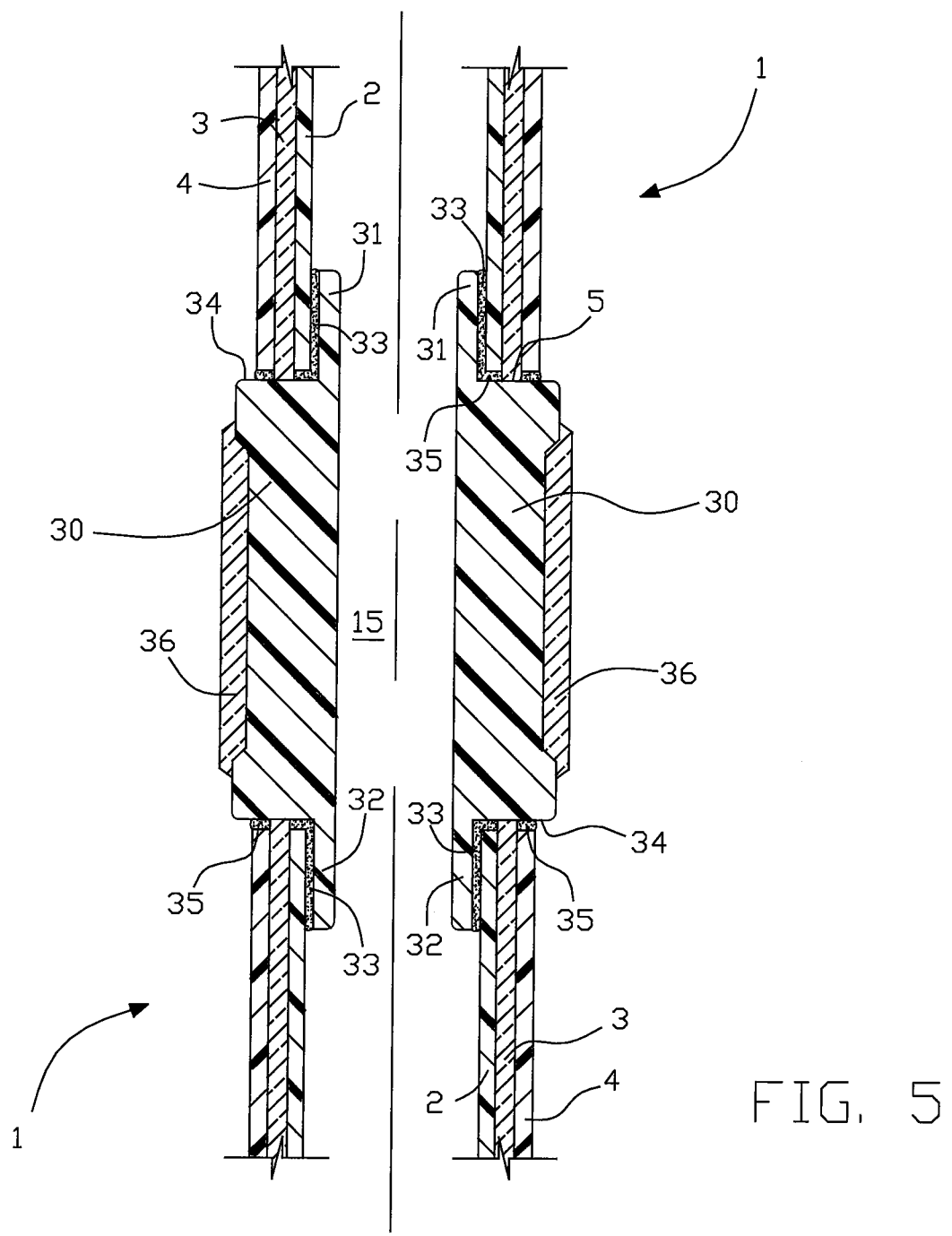
FIG. 5 is a cross section of an example embodiment of a custom fitting for tri-layered thermoplastic pipes.

As shown in FIG. 5, the TTP fitting 30 comprises a first insert 31 and a second insert 32. The first insert 31 is inserted into the TTP pipe 1 and thermal welded as described above, thereby forming a socket weld 33. The end 5 of the TTP pipe 1 abuts against a collar 34 on the TTP fitting 30, and the resulting interface between the end 5 and the collar 34 is thermal welded to form a collar weld 35. As shown in FIG. 5, the second insert 32 is inserted into the adjoining TTP pipe 1 and thermal welded in the same manner. It is preferred, but not required, that the TTP fitting 30 comprises a reinforcing member 36, as described above.

In various embodiments, the fitting member 21 comprises multiple insert sections to accommodate joinder of multiple TTP pipes 1. For example, a Y-shaped fitting member 21 comprises three insert sections, each of which functions in the same manner as the first insert 11 described above (not explicitly shown). Thus, a Y-shaped fitting member 21 would accommodate a split in a single TTP pipe 1 line. An ordinary practitioner would appreciate that T-shaped fittings, cross-shaped fittings, and many other configurations could also be accommodated according to the principles described above. In addition, the fitting member 21 could be a curved member, such as a 90° elbow, accommodating bends in the TTP pipe 1.

Figure 6:
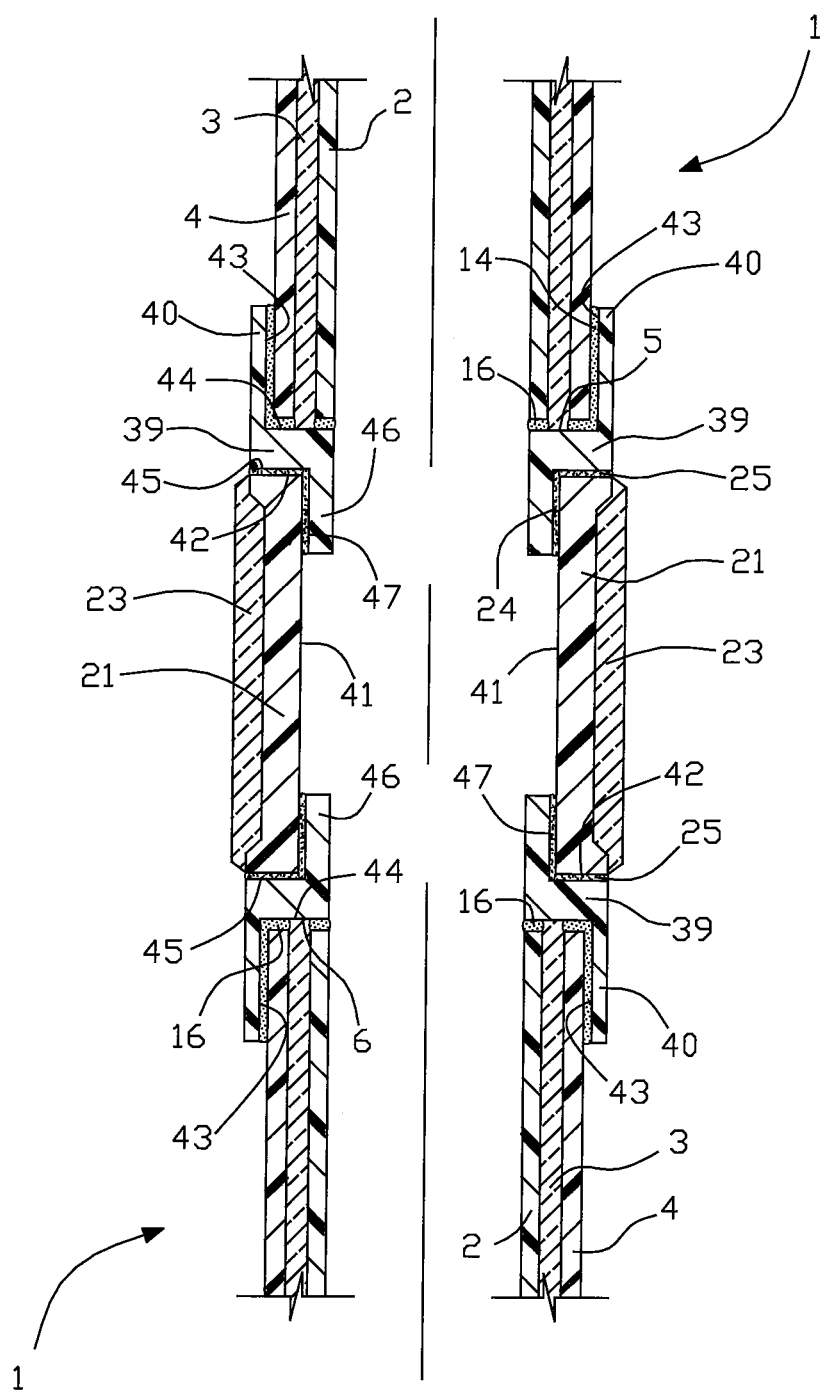
FIG. 6 shows a cross section of an example embodiment of a fitting member having a receptor for providing a socket weld on the outside surface of the pipe.
Figure 7:
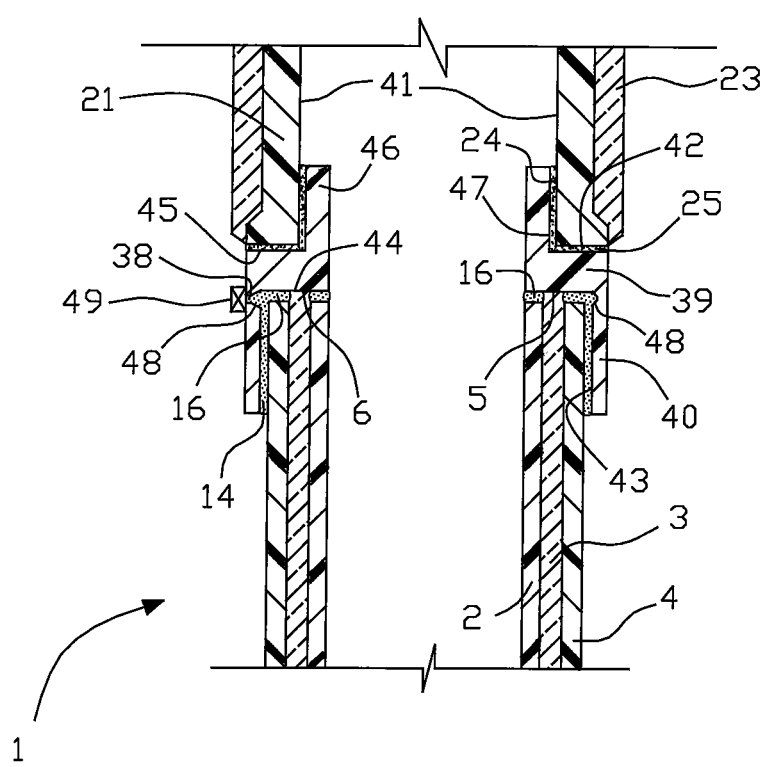
FIG. 7 is a cross section showing the embodiment of FIG. 6 with an annular channel disposed inside the receptor, and a valve in operable communication with the annular channel.
Figure 8:
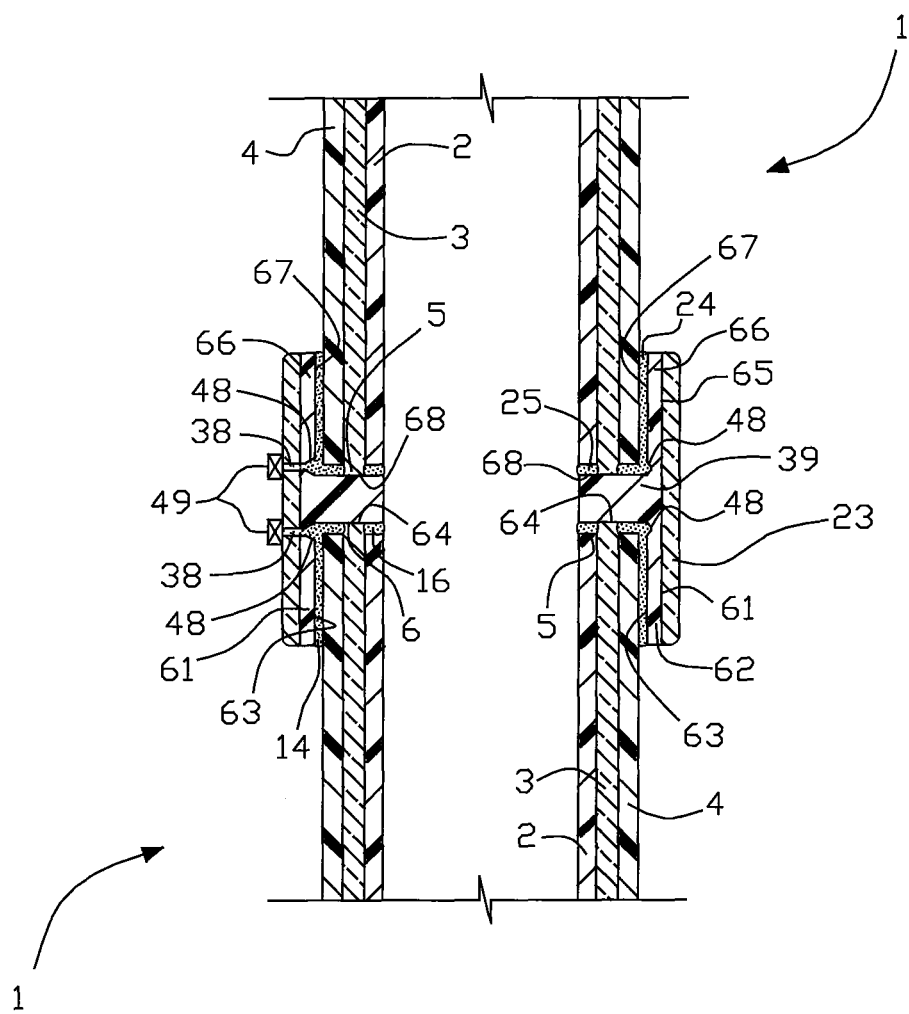
FIG. 8 shows a cross section of an example embodiment of a fitting member having a first receptor and a second receptor for directly connecting two thermoplastic pipes.

In another embodiment, shown in FIGS. 6-8, the fitting member 39 has a receptor 40 that is adapted to fit over the pipe 1 such that the first socket weld 14 fuses the inside surface of the receptor 40 to the outside surface of the pipe 1. The outside surface of the pipe 1 is the thermoplastic material of a single walled pipe 1, or the casing pipe 4 of a TTP pipe 1, or another similar pipe 1. This embodiment is adapted for connecting pipes 1 to a connector member 21, where the connector member 21 is a standard fitting in the industry or second thermoplastic pipe 1. The pipe 1 has an outside surface and an insertion end 5 having a face 6. The connector member 21 has an inside surface 41 and a connection end having a connector face 42. The fitting member 39 has a first side 44 and a second side 45. The receptor 40 is integrally connected to the first side 44 of the fitting member 39, and the receptor 40 has an annular receptor wall with an inside surface 43. The receptor wall has a thickness that is less than the width of the fitting member 39 such that the fitting member 39 defines a pipe abutting surface at the face of the first side 44 inside the receptor 40. The receptor 40 is configured to operably engage the pipe insertion end 5 for thermal welding, such that the inside surface 43 of the annular receptor wall contacts the outside surface of the pipe 1, and the pipe abutting surface 44 of the fitting member 39 contacts the face 6 of the insertion end 5 of the pipe 1. The respective surfaces are thermally fused as discussed above, thereby forming the first socket weld 14 and the first butt weld 16.

The fitting 39 comprises an insert 46 integrally connected to the second side 45 of the fitting member 39, the insert 46 having an annular insert wall with an outside surface 47. The insert wall has a thickness that is less than the width of the fitting member 39 such that the fitting member 39 defines a connector abutting surface at the face of the second side 45 outside the insert 46. The insert 46 is configured to operably engage the connection end 42 for thermal welding such that the outside surface 47 of the insert 46 contacts the inside surface 41 of the connector member 21, and the connector abutting surface 45 of the fitting member 39 contacts the connector face 42 of the connector member 21. The respective surfaces are thermally fused as discussed above, thereby forming the second socket weld 24 and the second butt weld 25.

In another embodiment, the receptor 40 further comprises an channel 48, such as an annular channel 48, for receiving molten thermoplastic material produced during the process of thermally welding and joining the pipe 1 to the receptor 40. When the pipe 1 is forced inside the receptor 40 during the thermal welding process, a bead of excess thermoplastic material is likely to be formed inside the receptor 40. The channel 48 is an elongate recess inside the receptor 40 that receives this bead of thermoplastic material, thus allowing the face 6 to be fully inserted into abutting contact with the pipe abutting surface 44 of the fitting member 39. It is preferable, but not required, that the channel 48 extends annularly around the entire circumference inside the receptor 40. The channel 48 can be located at the 90° interface between the receptor wall and the fitting member 39, or the channel 48 could be located within the receptor wall near the fitting member 39. Alternately, one or more channels 48 could be disposed within the inside surface 43 at an orientation substantially parallel to the longitudinal axis of the inserted pipe 1.

In another embodiment, the receptor 40 further comprises a valve 49 configured for releasing air or any other gas during the process of thermally welding and joining the pipe 1 to the receptor 40. The valve 49 comprises a hole 38, such as a bore hole, through either the receptor 40 or the fitting member 39, or both. The hole 38 extends to the inside of the receptor 40 near the pipe abutting surface 44. The hole 38 allows gas, such as air, to escape from inside the receptor 40 during the thermal welding process. The valve 49 can be configured to remain open, or to allow the release of gas once the gas pressure reaches a certain magnitude. In this embodiment, the valve 49 can be further configured to release molten thermoplastic during the process of thermally welding and joining the pipe 1 to the receptor 40. This release of thermoplastic provides a visual indicator that the thermal weld was properly made, and that the resulting socket welds and butt welds are properly formed. In another embodiment, the valve 49 is configured in operable communication with the annular channel 48 such that the channel 48 gathers gas and/or molten thermoplastic from around the circumference of the receptor 40, and the channel 48 channels the gathered gas and molten thermoplastic to the bore hole of the valve 49 for release. One or more valves 49 may be disposed about the circumference of the fitting member 39, as needed for proper venting of the inside of the receptor 40 during the thermal welding process.

In another embodiment, shown in FIG. 8, the fitting member 39 comprises a first receptor 61 integrally connected to a first side of the fitting member 39. The first receptor 61 has a first annular receptor wall 62 with a first inside surface 63, and the first receptor wall 62 has a thickness that is less than the width of the fitting member 39 such that the fitting member 39 defines a pipe abutting surface 64 inside the first receptor 61. The first receptor 61 is configured to operably engage the pipe insertion end 5 for thermal welding, such that the first inside surface 63 contacts the outside surface of the pipe 1, and the pipe abutting surface 64 of the fitting member 39 contacts the face 6 of the insertion end 5 of the pipe 1.

This embodiment further comprises a second receptor 65 integrally connected to a second side of the fitting member 39, the second receptor 65 having a second annular receptor wall 66 with a second inside surface 67, and the second receptor wall 66 having a thickness that is less than the width of the fitting member 39 such that the fitting member 39 defines a connector abutting surface 68 inside the second receptor 65. The second receptor 65 is configured to operably engage the connection end 42 for thermal welding, such that the second inside surface 67 contacts the outside surface of the connector member 21, and the connector abutting surface 68 of the fitting member 39 contacts the connector face of the connector member 21. In many cases, the connector member 21 is a second thermoplastic pipe 1. This embodiment can optionally comprise the channel 48 and valve 49, as discussed above in connection with the foregoing embodiments.

Figure 9:
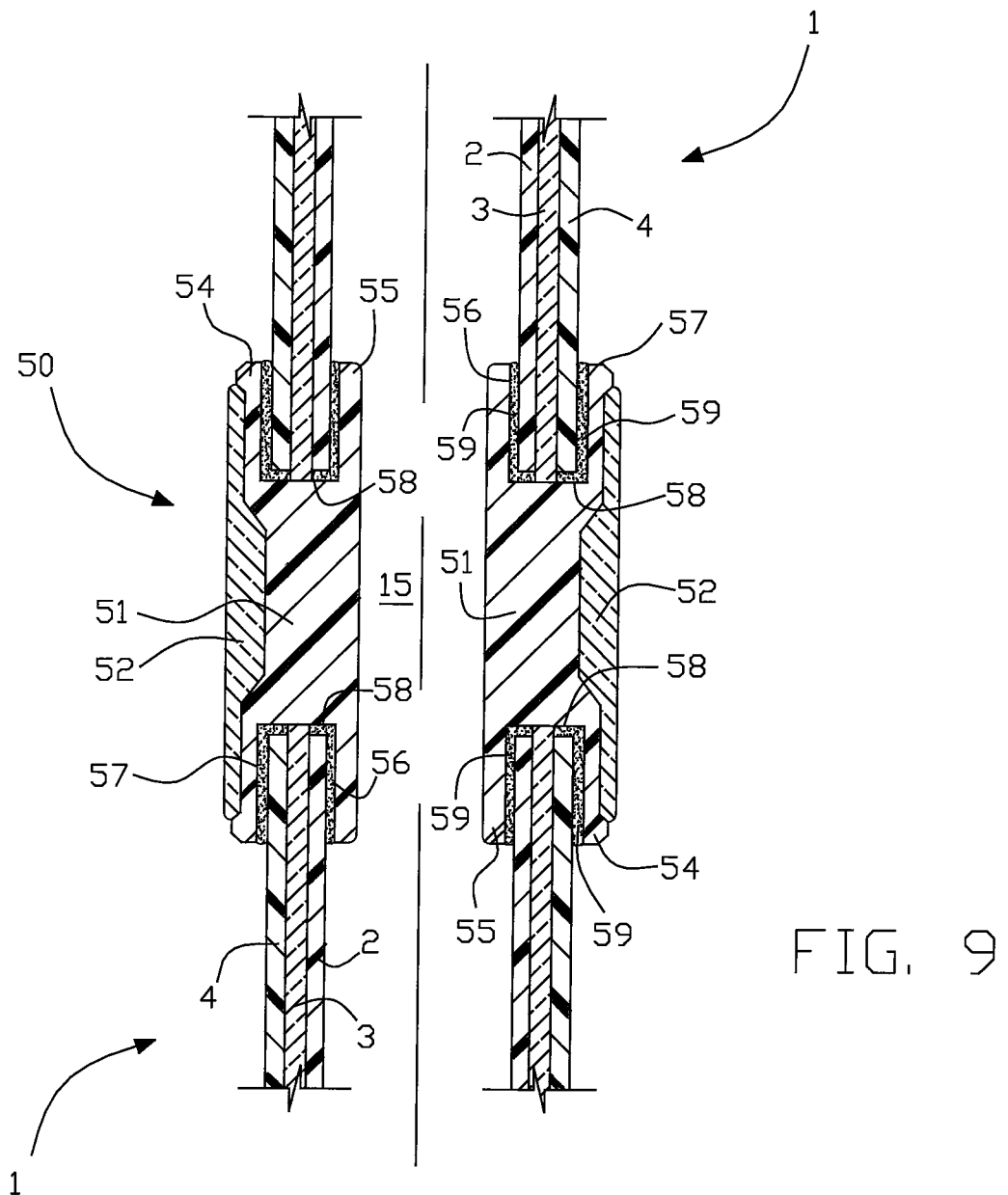
FIG. 9 is a cross section of one example embodiment of a glass fiber reinforced double socket fusion fitting for tri-layered thermoplastic pipes.
Figure 10:
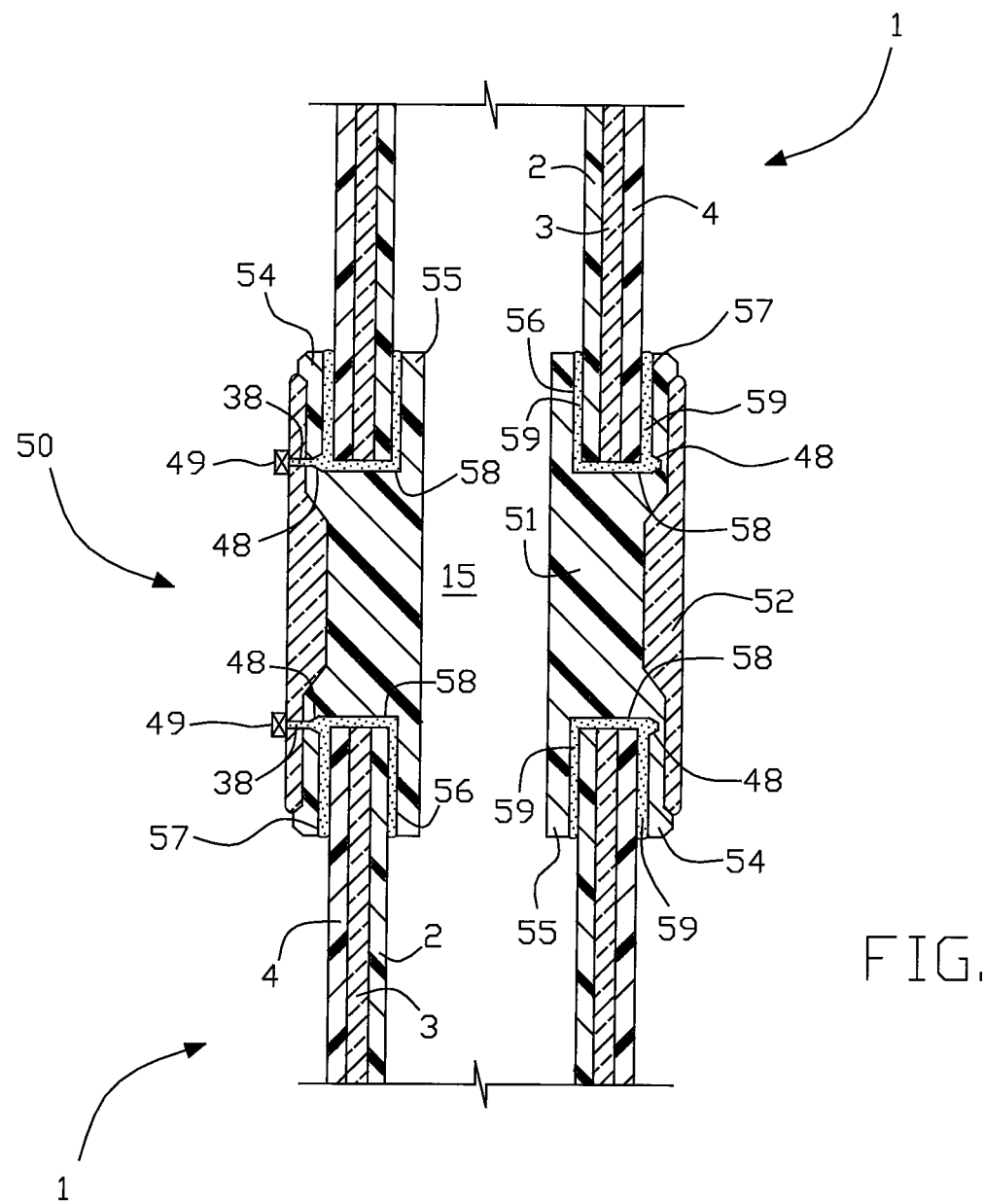
FIG. 10 is a cross section showing the embodiment of FIG. 9 with an annular channel disposed inside the receptor, and a valve in operable communication with the annular channel.

In another embodiment of the TTP fitting 50, shown in FIGS. 9 and 10, the TTP fitting 50 is a double socket/abutted fitting comprising a base member 51, and one or more coupling sections having an outer rim 54 and an inner rim 55. The base member 51 is a thermoplastic material capable of being thermal welded to the thermoplastic material of the TTP pipe 1, such as the process pipe 2 or the casing pipe 4, or both. The base member 51 is formed by any conventional method of manufacturing or forming thermoplastic pipe fittings.

As described above, the base member 51 can be formed with or without a reinforcing member 52. The reinforcing member 52 is a glass fiber matrix that is applied to and bonded to the base member 51 by any conventional means, which will be appreciated by an ordinary practitioner. Such bonding means could be by an epoxy, a resin, a thermoset bond, or the like.

The coupling section of the fitting 50 generally comprises components to form a flange face connection, also called a butt weld connection, and a double socket connection. The coupling section comprises an annular channel having a U-shaped cross section for receiving and mating with the end 5 of the TTP pipe 1. The U-shaped channel is defined by the outer surface 56 of the inner rim 55, the inner surface 57 of the outer rim 54, and an abutting surface 58 spanning between the outer surface 56 and the inner surface 57. The U-shaped channel is sized to snugly receive the TTP pipe 1, thus forming sufficiently snug contact between: (i) the outside surface 56 and the inner surface of the TTP pipe 1; (ii) the inside surface 57 and the outer surface of the TTP pipe 1; and (iii) the abutting surface 58 and the end 5 of the TTP pipe 1. Once the end 5 is mated with the U-shaped channel, the base member 51 is thermal welded to the TTP pipe 1, forming a substantially U-shaped weld 59, discontinuous only where the glass fiber reinforcing 3 abuts the abutting surface 58. This U-shaped weld 59 ensures that the glass fiber reinforcing 3 in the TTP pipe 1 and the reinforcing member 52 are protected from corrosive media 15 that may be transported through the TTP pipe 1.

Optionally, other embodiments of the coupling sections further comprise a channel 48 or a valve 49, or both, as discussed above in relation to the foregoing embodiments of the connection fitting 39. The channel 48, preferably in an annular orientation, is configured to receive molten thermoplastic, as described above. The valve 49 is configured to release gas or molten thermoplastic, or both. In this embodiment, as the pipe 1 is inserted into the coupling section, air becomes trapped inside the U-shaped channel. This air is forced into the hole 38 and eventually to the valve 49 for release. Molten thermoplastic can be gathered and released in the same manner, thereby providing a visual indication of a proper thermal weld seal. The channel 48 facilitates the venting process by gathering and channeling the air and molten thermoplastic for passage through the hole 38 and to the valve 49 for release.

In various embodiments, the TTP fitting 50 comprises two or more coupling sections, one for each TTP pipe 1 connecting to the joint. For example, a Y-shaped TTP fitting 50 comprises three coupling sections, each of which accommodates one TTP pipe 1 end 5. Thus, a Y-shaped TTP fitting 50 would accommodate a split in a single TTP pipe 1 line. T-shaped fittings, cross-shaped fittings, 90° elbows, and other configurations could also be accommodated according to the principles of the invention. In addition, the TTP fitting 50 could be a curved member, accommodating bends in the TTP pipe 1.

The foregoing embodiments are merely representative of the connection fitting, and these embodiments are not meant for limitation of the invention. For example, one having ordinary skill in the art would appreciate that there are several embodiments and configurations of sockets, coupling sections, reinforcing members, and other components that will not substantially alter the nature of the connection fitting assembly. Consequently, it is understood that equivalents and substitutions for certain elements and components set forth above are part of the invention described herein, and the true scope of the invention is set forth in the claims below.

I claim:

1. A joint connection fitting for connecting a thermoplastic pipe to a connector member, the pipe having an outside surface, an inside surface, and an insertion end having a face, and the connector member having an outside surface, an inside surface, and a connection end having a connector face, said joint connection fitting comprising:

a base member having a first side and a second side;

a first coupling section integral with the base member, the first coupling section having a first outer rim with an first inner surface with a circumference, and a first inner rim with a first outer surface, the first outer rim and the first inner rim being spaced apart such that the base member defines a first abutting surface between the first outer rim and the first inner rim, wherein the first coupling section is configured to operably engage the pipe insertion end for thermal welding, such that the first inner surface of the first outer rim contacts the outside surface of the pipe, the first outer surface of the first inner rim contacts the inside surface of the pipe, and the first abutting surface of the base member contacts the face of the insertion end of the pipe; and a second coupling section integral with the base member, the second coupling section having a second outer rim with a second inner surface with a circumference, and a second inner rim with a second outer surface, the second outer rim and the second inner rim being spaced apart such that the base member defines a second abutting surface between the second outer rim and the second inner rim, wherein the second coupling section is configured to operably engage the connection end for thermal welding, such that the second inner surface of the second outer rim contacts the outside surface of the connector member, the second outer surface of the second inner rim contacts the inside surface of the connector member, and the second abutting surface of the base member contacts the connector face of the connection member; wherein the first coupling section further comprises a first channel extending annularly around the circumference of the first inner surface inside the first coupling section, the first channel configured for receiving molten thermoplastic material produced during the process of thermally welding and joining the pipe to the first coupling section, the first channel being disposed in the first inner surface adjacent to the interface between the base member and the first coupling section; and wherein the second coupling section further comprises a second channel extending annularly around the circumference of the second inner surface inside the second coupling section, the second channel configured for receiving molten thermoplastic material produced during the process of thermally welding and joining the connector member to the second coupling section, the second channel being disposed adjacent to the second inner surface at the interface between the base member and the second coupling section.

2. The joint connection fitting of claim 1, wherein:
the first coupling section further comprises a first valve configured for releasing gas during the process of thermally welding and joining the pipe to the first coupling section; and
the second coupling section comprises a second valve configured for releasing gas during the process of thermally welding and joining the connector member to the second coupling section.

3. The joint connection fitting of claim 1, further comprising:
a first valve in operable communication with the first channel, wherein the first valve is configured for releasing molten thermoplastic material during the process of thermally welding and joining the pipe to the first coupling section; and
a second valve in operable communication with the second channel, wherein the second valve is configured for releasing molten thermoplastic material during the process of thermally welding and joining the connector member to the second coupling section.

4. A joint connection fitting for connecting two thermoplastic pipes, said joint connection fitting comprising:
a first coupling section having a first abutting surface, a first outer rim with an first inner surface with a circumference, and a first inner rim with a first outer surface, the first outer rim and the first inner rim being spaced apart such that the first abutting surface spans between the first outer rim and the first inner rim, the first coupling section comprising a first channel extending annularly around the circumference of the first inner surface inside the first coupling section, the first channel configured for receiving molten thermoplastic material, the first channel disposed within the first inner surface and located adjacent to the interface between the first outer rim and the first abutting surface, the first coupling section further comprising a first valve, the first valve comprising a bore hole connected to the first channel, the first channel configured to receive and channel molten thermoplastic; and
a second coupling section having a second abutting surface, a second outer rim with a second inner surface with a circumference, and a second inner rim with a second outer surface, the second outer rim and the second inner rim being spaced apart such that the second abutting surface spans between the second outer rim and the second inner rim, the second coupling section comprising a second channel extending annularly around the circumference of the second inner surface inside the second coupling section, the second channel configured for receiving molten thermoplastic material, the second channel disposed within the second inner surface and located adjacent to the interface between the second outer rim and the second abutting surface, the second coupling section further comprising a second valve, the second valve comprising a bore hole connected to the second channel, the second channel configured to receive and channel molten thermoplastic.

* * * * *